United States Patent [19]

Cunningham et al.

[11] Patent Number: 5,790,341
[45] Date of Patent: Aug. 4, 1998

[54] METHOD AND APPARATUS FOR REDUCING SERVO INTERFERENCE IN A MAGNETO-RESISTIVE HEAD USING SKEW BETWEEN HEAD AND SERVO PATTERN

[75] Inventors: Earl A. Cunningham; Jodie A. Christner, both of Rochester, Minn.; Thomas C. Christensen, Johnston, Iowa; David T. Flynn, Rochester, Minn.; Mark A. Bergquist, Rochester, Minn.; Mark D. Hagen, Rochester, Minn.

[73] Assignee: International Business Machines Corporation, Armonk, N.Y.

[21] Appl. No.: 530,989

[22] Filed: Sep. 20, 1995

[51] Int. Cl.⁶ ............................................. G11B 5/56
[52] U.S. Cl. ............................................. 360/76; 360/77.01
[58] Field of Search .................. 360/75, 76, 77.01, 360/77.07, 77.08, 113, 77.11, 119, 124

[56] References Cited

U.S. PATENT DOCUMENTS

| | | | |
|---|---|---|---|
| 3,881,190 | 4/1975 | Brock et al. | 360/113 |
| 3,940,797 | 2/1976 | Brock et al. | 360/113 |
| 3,975,772 | 8/1976 | Lin | 360/113 |
| 4,071,868 | 1/1978 | Kaminaka et al. | 360/113 |
| 4,418,366 | 11/1983 | Moriya | 360/75 |
| 4,420,778 | 12/1983 | Sakamoto | 360/77.16 |
| 4,669,004 | 5/1987 | Moon et al. | 360/77.08 X |
| 4,698,711 | 10/1987 | Vinal | 360/113 |
| 4,902,971 | 2/1990 | Guzik et al. | 324/212 |
| 4,935,832 | 6/1990 | Das et al. | 360/112 |
| 4,945,427 | 7/1990 | Cunningham | 360/75 |
| 4,975,791 | 12/1990 | Eggebeen | 360/77.01 |
| 4,979,051 | 12/1990 | Eggebeen | 360/21 |
| 5,075,956 | 12/1991 | Das | 29/603 |
| 5,170,299 | 12/1992 | Moon | 360/77.08 |
| 5,229,901 | 7/1993 | Mallary | 360/77.02 X |
| 5,257,149 | 10/1993 | Meyer | 360/78.14 |
| 5,315,454 | 5/1994 | Fukakusa | 360/75 |
| 5,323,285 | 6/1994 | Smith | 360/113 |
| 5,339,207 | 8/1994 | Moon et al. | 360/77.08 X |
| 5,444,589 | 8/1995 | Hu et al. | 360/113 |
| 5,452,151 | 9/1995 | Money et al. | 360/75 |

OTHER PUBLICATIONS

C. Denis Mee etal., Magnetic Recording, vol. II Computer Data Storage, Ch3, pp. 142–147, 1988.

*Primary Examiner*—Aristotelis M. Psitos
*Assistant Examiner*—K. Wong
*Attorney, Agent, or Firm*—William D. Miller; Tyler L. Nasiedlak

[57] ABSTRACT

A method and apparatus is provided which introduces a relative skew between a servo pattern and a magneto-resistive (MR) head in order to reduce interference introduced by inductive reading of shields formed as part of the MR head. The relative skew may be accomplished by introducing a skew angle directly on the head or by skewing the servo pattern formed on the magnetic medium relative to the head. Various skewed patterns may be used to reduce the overall interference.

25 Claims, 17 Drawing Sheets

METHOD AND APPARATUS FOR REDUCING SERVO INTERFERENCE IN A MAGNETO-RESISTIVE HEAD USING SKEW BETWEEN HEAD AND SERVO PATTERN

BACKGROUND OF THE INVENTION

The present invention is directed to a method and apparatus for reducing interference in a magneto-resistive (MR) head, and more particularly, to the use of a relative skew between the MR head and a pattern on a magnetic media in order to reduce interference.

Recently, memory storage devices have employed heads including MR elements (i.e., an MR head) to read and write data from and to a magnetic media, such as a magnetic disk. A typical MR head includes a write element, formed as a regular thin film head and a read element implemented with the MR element. This type of MR head further includes shielding around the MR element to isolate the MR element from extraneous magnetic fields, to narrow the read pulse detected by the MR element, and to divert flux from the write head away from the MR element to prevent the MR element from failing.

In certain conventional memory storage devices utilizing a shielded MR head, an undesirable interference phenomenon has been identified in signals read from the magnetic media using the MR head. The interference phenomenon becomes even more pronounced as the operating frequency of the storage device is increased. In many instances, the interference is sufficient to adversely affect performance of the storage device. It is therefore desirable to reduce, to the extent possible such interference in the signal picked up by the MR head.

SUMMARY OF THE INVENTION

In accordance with an aspect of the present invention there is provided a memory device for storing data including a disk rotatably mounted within a housing and having a servo pattern formed on the surface of the disk. The servo pattern extends over a number of tracks formed on the disk to store information. The pattern is formed at a first orientation relative a radial line extending from a center of the disk. The device also includes a transducer, including a shielded magneto-resistive element, which is movably mounted within the housing to read the information from the disk. The transducer being mounted with a second orientation relative to the radial line to form a relative skew between the servo pattern and the transducer thereby reducing an interference component of a signal read by the transducer. This may be accomplished by skewing either the head or the servo pattern relative to a typical orientation.

The transducer typically includes a first and second shield having a gap therebetween with a magneto-resistive element disposed within the gap. The interference is caused as magnetic flux leaks through the gap between the first and second shields.

In accordance with still another aspect-of the invention there is provided a memory disk adapted for use in a disk storage device using a magneto-resistive transducer for reading information from the memory disk. The memory disk includes a plurality of concentric tracks provided around the memory disk and including a plurality of servo sectors. Servo patterns associated with the servo sectors are provided and include a plurality of burst patterns extending in a generally radial direction across the plurality of tracks. Each burst is offset by a corresponding distance from a position on the disk over which a transducer would be positioned at a constant angular position of the disk.

In accordance with another aspect of the invention there is provided a method of forming a servo pattern over a plurality of consecutive tracks on a memory disk for use in a disk storage device. The method includes the steps of: (a) positioning the transducer at a first position corresponding to a beginning track of said plurality of consecutive tracks; (b) rotating said disk to a first angular position; (c) writing a servo burst pattern to the disk at the first angular position of the disk; (d) moving the transducer a predetermined distance toward the ending track of said plurality of consecutive tracks; (e) rotating said disk to an angular position offset from the first angular position by a value corresponding to a position of the transducer; (f) writing a servo burst pattern to the disk at the angular position of the disk in step (e); and (g) repeating steps (d) through (f) until a position of the transducer corresponds to the ending track of said plurality of consecutive tracks.

In accordance with still another aspect of the invention there is provided a disk storage device, including a disk mounted in a drive housing. The disk has a plurality of concentric tracks. A servo pattern extends across the tracks. The device also includes a rotary actuator and a magneto-resistive (MR) head mounted to the rotary actuator. The MR head has a shield extending across a number of the tracks along a shield axis in a direction substantially perpendicular to the head axis of the MR head. The rotary actuator rotates along a prescribed arc so as to selectively position the MR head above a desired track. The shield axis is skewed relative to a direction in which said servo pattern extends across the tracks.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF PREFERRED EMBODIMENTS

Figure 1:
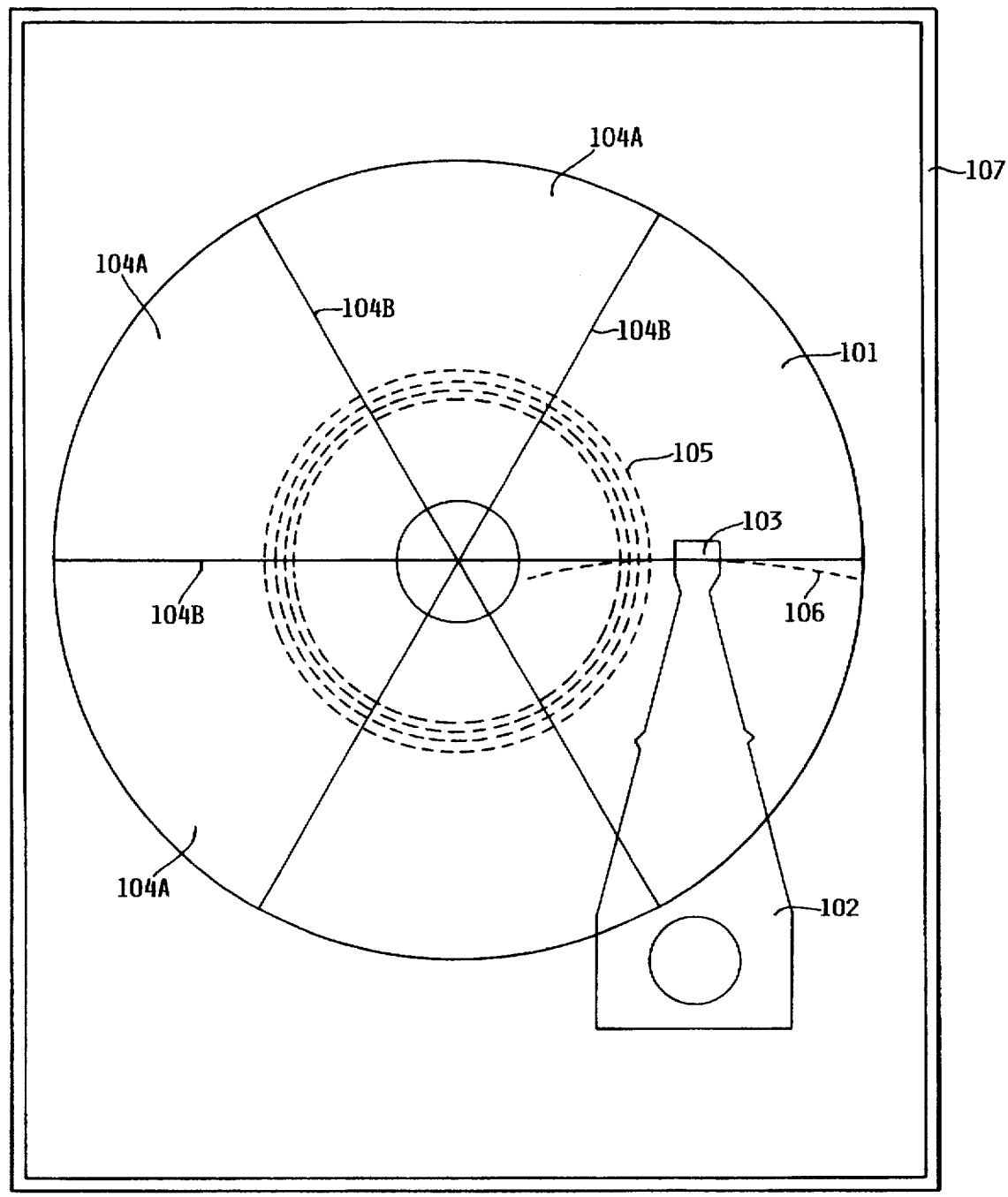
FIG. 1 illustrates a portion of a disk drive apparatus.

In FIG. 1 components of a disk storage device are illustrated for purposes of describing the various embodiments of the invention. It is noted, however, that the described invention could be implemented in any memory storage device using a shielded MR head which picks up inductive interference in its shield. For example, the invention may be provided in a multiple-track tape drive using an MR read head and having servo transitions aligned across the tracks.

In FIG. 1, a magnetic disk 101 and rotary actuator 102 are illustrated. The disk 101 and actuator 102 are mounted in a housing 107 along with other standard elements of a disk drive (not shown). The rotary actuator 102 is rotated by a voice coil motor (not shown) to position the head 103 over tracks 105 formed on the disk to write and read information to and from the disk 101. This disk may be used to store data such as computer data, video data, audio data, and the like. The tracks 105 extend around the disk 101 in a concentric fashion. The tracks 105 may be formed as a number of concentric circles or as one or more continuous concentric spiral tracks.

As described above, the rotary actuator 102 moves the head 103 to a desired track on the disk 101 to write and/or read information to and from the track. The head 103 moves in a generally radial direction between the inner and outer diameter of the disk across the surface of the disk 101. Due to the rotary motion of the actuator 102, the actual movement of the head 103 follows arc 106.

Memory storage devices use servo information often times embedded within the storage medium to position the read and/or write heads over the desired track. In a disk drive, for example, the read/write head reads a servo pattern contained in a servo field to determine the radial and circumferential position of the read/write head relative to the disk. Extremely accurate servo control is particularly important when high track densities are used. A typical disk drive, for example, may have in excess of 2000 tracks per inch requiring extremely precise control to position the head over a desired track.

As illustrated in FIG. 1, disk storage device typically includes a number of servo sectors 104A. At the beginning of each servo sector 104A, a servo pattern 104B (e.g., a sector identification pattern) is provided which contains servo information. The servo patterns are typically formed on the disk at equally spaced intervals around the disk and along the direction of the tracks 105. The servo patterns 104B are generally formed to be substantially continuous from the inner to outer diameter of the disk (or over a group of tracks on the disk) so as to be readable by the head 103 at any position along the arc 106. In addition to servo patterns 104B, other servo patterns are also typically provided on the disk. For example, Gray code patterns are formed on the disk. Gray codes extend in a generally radial direction across a number of tracks 105. Like other servo patterns, the Gray codes are continuous over the tracks which they encompass and are made up of a number of phase aligned transitions.

Figure 2:
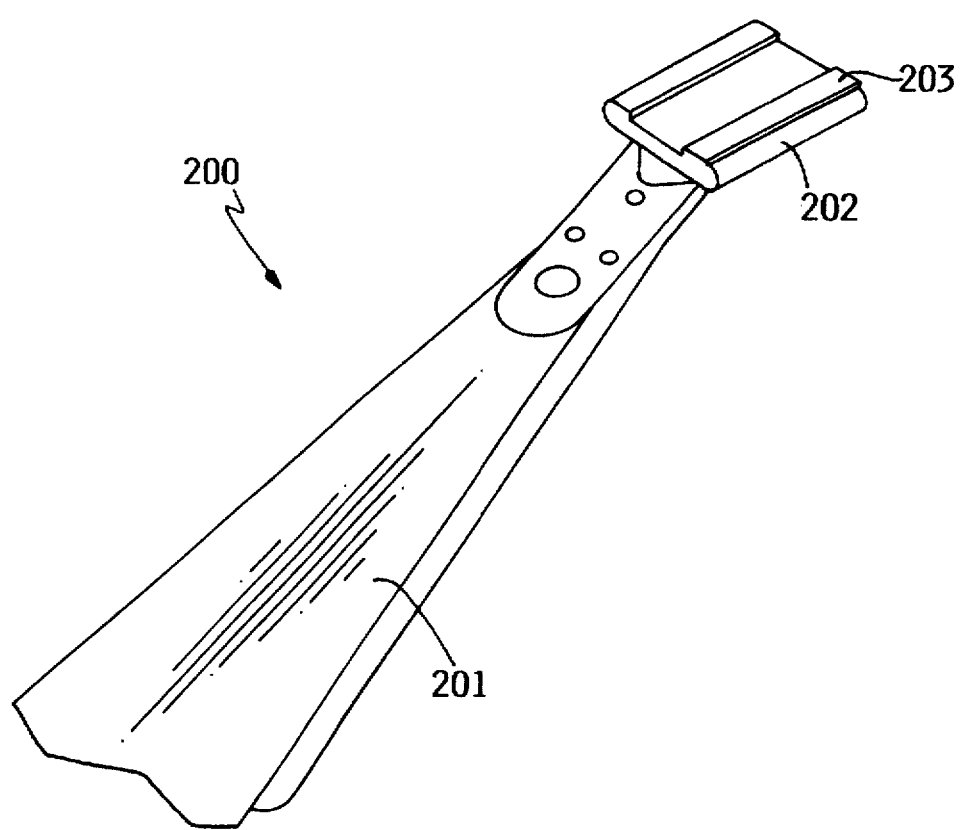
FIG. 2 illustrates a head suspension assembly.

In FIG. 2 a typical head suspension assembly 200 is illustrated. The head suspension assembly 200 includes a flexure arm 201 which carries a magnetic head assembly 202. Magnetic head assembly 202 includes a slider 203 having aerodynamic properties sufficient to allow the head assembly 202 to fly over the surface of storage disk 101 (FIG. 1). Flexure arm 201 is spring loaded and opposes the aerodynamic lift from slider 203 to control a flying height over the surface of the disk.

Figure 3:
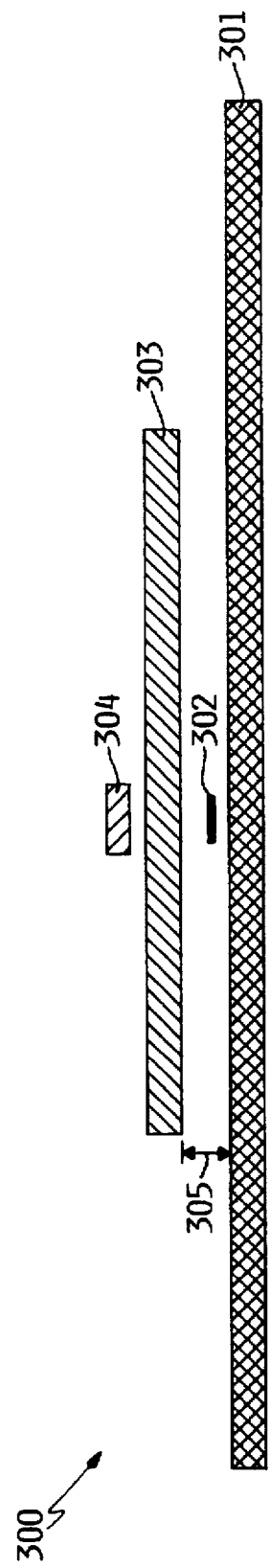
FIG. 3 illustrates functional components of an MR head used in accordance with an embodiment of the invention.

The general layout of the principle elements in a typical merged MR head 300 is illustrated in FIG. 3. The illustration is not drawn to scale, but rather is provided for ease of illustration of the relative orientation of the various elements. The MR head includes a pair of shields 301 and 303. An MR element 302 is located between the shields 301 and 303. The MR element 302 operates as a read element of the MR head 300.

Element 303 in conjunction with element 304 form a thin film magnetic head functioning as a write element for the MR head 300. Elements 303 and 304 operate respectively as first and second poles of the thin film write element. The dual function of element 303 (i.e., acting as a first pole of the write element and as a second shield) produces the merged nature of the MR head. Insulation layers (not shown for purposes of clarity), such as glass, are formed between the various elements of the MR head 300.

By way of example, a typical MR head may be constructed having the following dimensions. The first pole/second shield 303 may have a width of approximately 100 micrometers (µm). The second pole 304 has a width of approximately 5 µm. The first shield 301 has a width in excess of 200 µm. The MR element 302 is approximately 300 angstroms (Å) thick and lies in the gap 305 between the first shield 301 and the first pole/second shield 303. The gap 305 is approximately 0.4 µm and is filled with an insulation material which surrounds the MR element 302.

Figure 4:
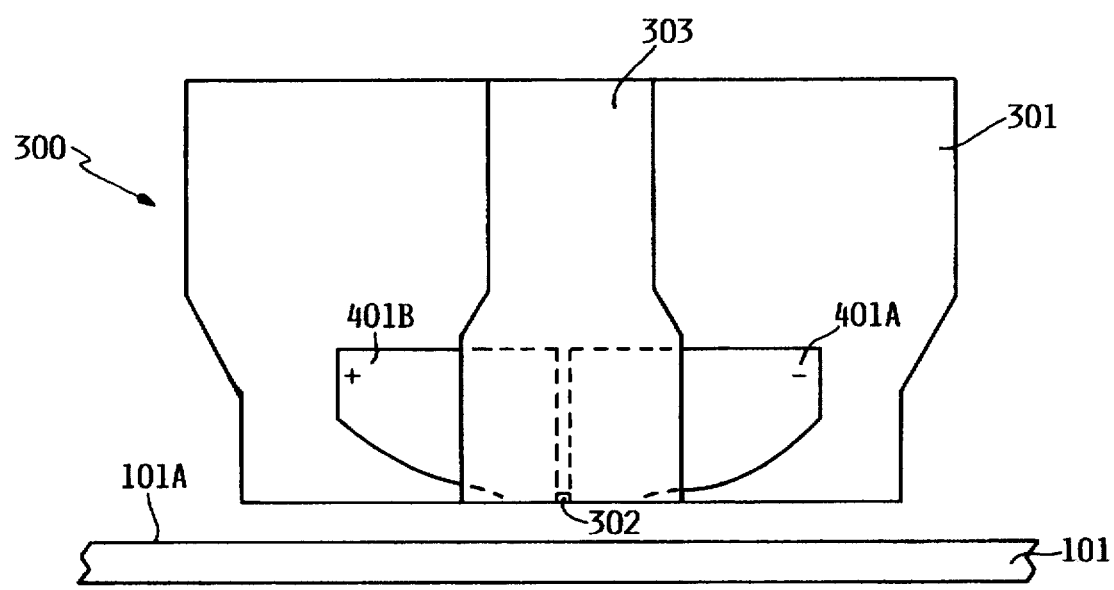
FIG. 4 illustrates another view of the MR head illustrated in FIG. 3.

A side view of the MR head depicted in FIG. 3 is illustrated in FIG. 4. As depicted in FIG. 4, the first shield 301, MR element 302, and second shield 303 extend upward from the surface 101A of disk 101 in respective vertical planes. The second pole 304 is removed for purposes of clarity. The planes of the elements are parallel running in the direction of the plane of the page. In the illustration, the plane of the first pole/second shield 303 is closest, followed by the MR element 302, with the first shield 301 being farthest away. Also depicted in FIG. 4 are the negative and positive MR leads 401A, 401B, respectively. These leads are formed on the first shield and lie in a plane between the first shield 301 and the first pole/second shield 303. The leads 401A and 401B are coupled to the MR element 302 in a conventional manner and operate in the normal fashion. Accordingly, further description is not provided.

Referring to FIGS. 3 and 4, the source of the undesirable interference phenomenon found in signals read using a typical merged MR head will be described. The construction of the MR head allows for leakage of magnetic flux between the first shield 301 and the first pole/second shield 303 of the MR head. When the leakage between the two shields 301 and 302 is sufficient to form effective closure for magnetic flux therebetween, the shield structure forms an effective one turn thin-film inductive read head (referred to hereinafter as the "inductive read head"). The width of the inductive read head is essentially the width of the second shield 303 (e.g., approximately 100 µm).

A shield having the above dimensions (i.e., 100 µm) will form an inductive read head which extends across approximately 18 tracks or more, depending on the track density. The undesirable interference phenomenon is most pronounced when all of the tracks beneath the effective read head are phase aligned. In such a case, the inductive pickup may be as high as 30% of the MR servo signal at outer diameter (OD) tracks and is significantly smaller at inner diameter (ID) tracks. Servo patterns often utilize phase aligned servo transitions. As a result, disk storage devices using shielded MR structures are particularly sensitive to the interference introduced into the read signal by the effective inductive read head when reading servo information from the disk. In many cases, the described interference is sufficient to introduce servo errors.

Figure 5A:
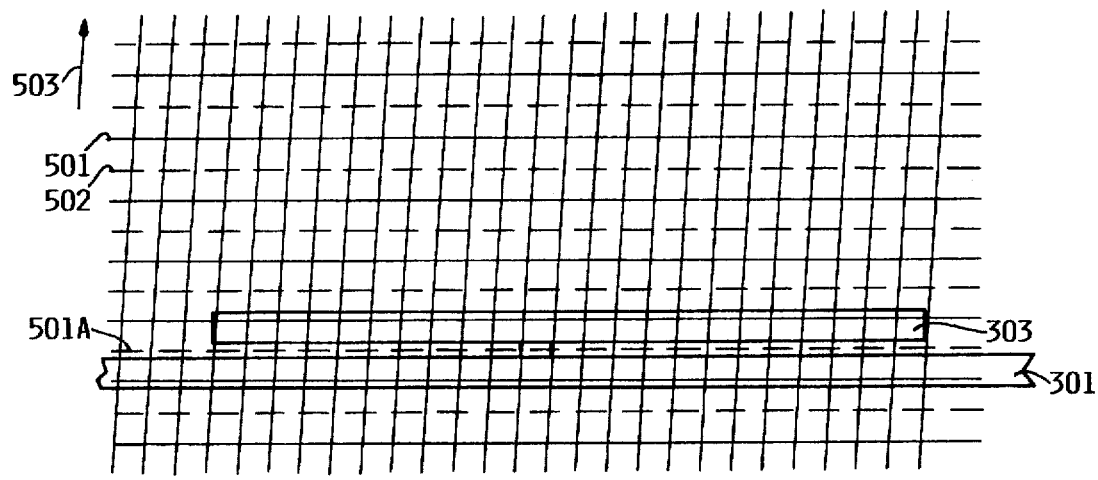
FIGS. 5A–5C illustrate an operation of an embodiment of the invention.

The large interference component of a read signal typically obtained when reading servo patterns in accordance with a conventional approach results from the alignment of servo transitions within the gap of the inductive read head as depicted in FIG. 5A. In FIG. 5A, a number of negative 501 (solid lines) and positive 502 (dashed line) polarity transitions, alternating along the direction of the tracks, illustrated by arrow 503, are depicted. As can be appreciated in FIG. 5A, the gap between shields 301 and 303 aligns along a line of polarity transitions 501A. As a result, the effective inductive read head will read a maximum amplitude interference signal.

Figure 5B:
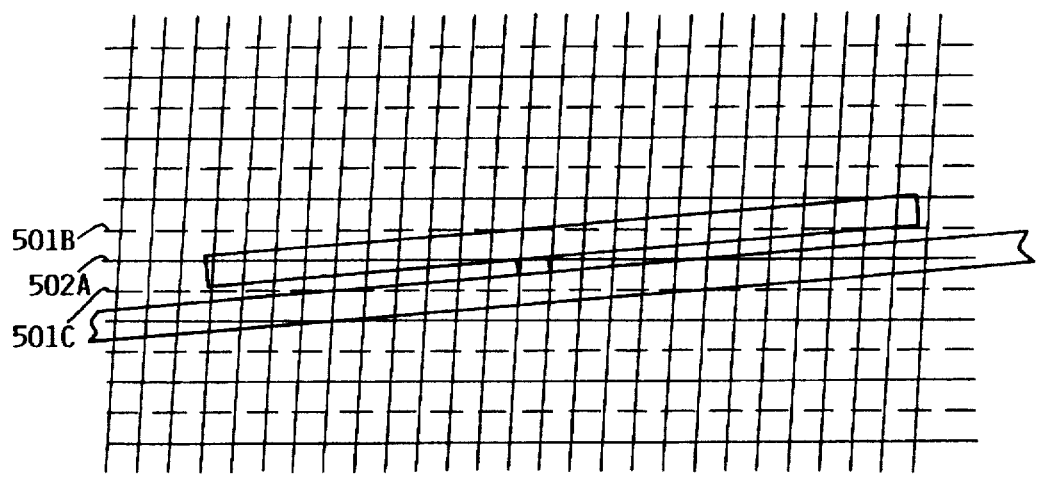

Referring to FIG. 5B, a mechanism for reducing the overall interference phenomenon associated with the inductive read head of shields 301 and 303 will be described. In FIG. 5B, the head and the servo pattern are skewed relative to one another. As described more fully below, this may be accomplished by skewing the head relative to the written servo pattern or by skewing the alignment of the pattern relative to the head. In FIG. 5B, a positive transition on line 502A is shown near the center of the gap in shields 301 and 303 at a position centered along the width of the gap. Further, negative transitions on lines 501B and 501C on each side of line 502A are shown crossing the gap near the ends of shield 303. Thus, if these two points are separated by 360°, the inductive read head (i.e., the width of shield 303) inductively reads signals from the phase aligned servo pattern having components ranging over approximately 360°.

Figure 5C:
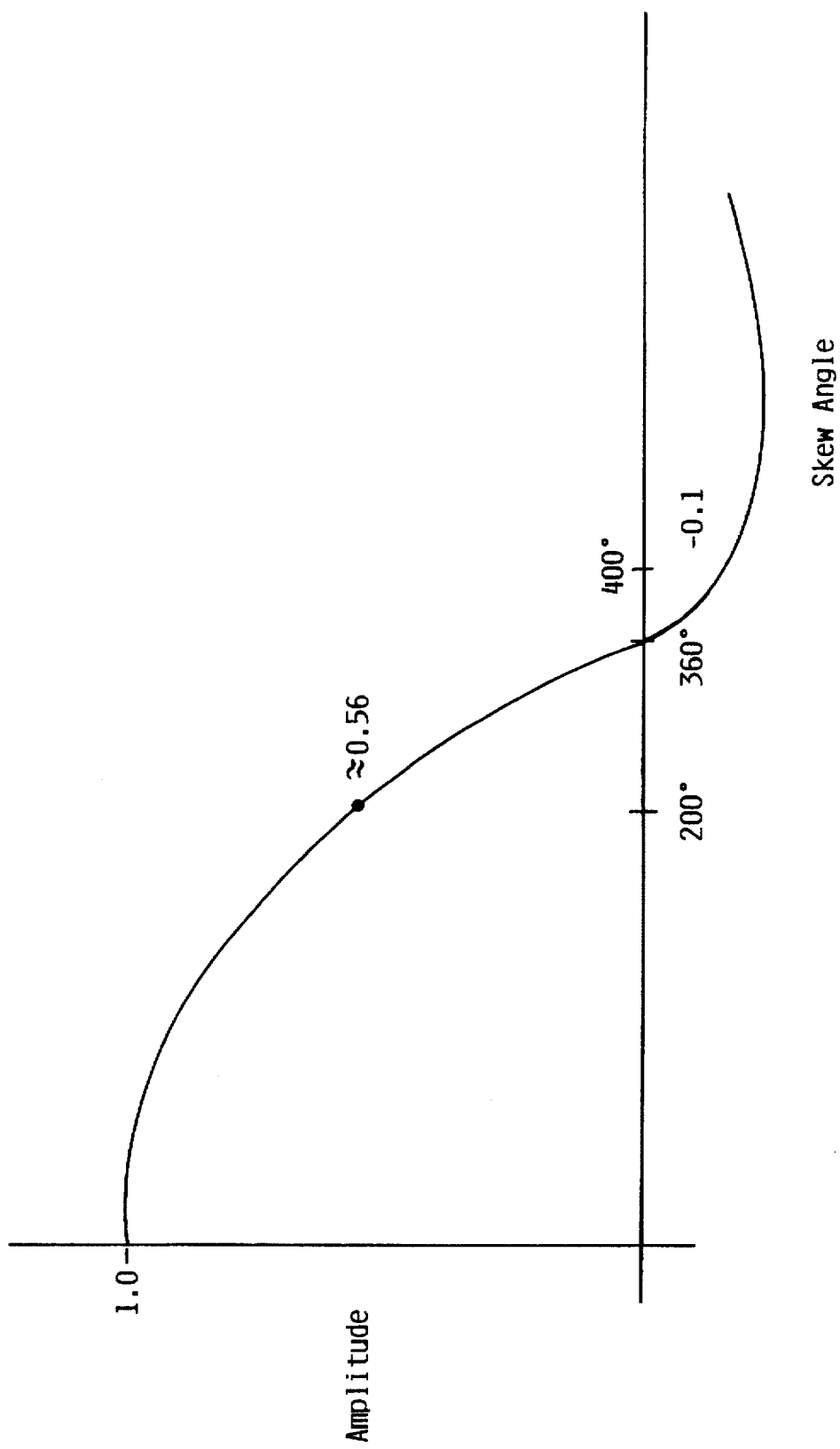

The skew between the head and the servo pattern causes a drop in the amplitude of the interference pattern as a function of (sin x)/x. A graph depicting the relationship between amplitude and skew angle is depicted in FIG. 5C. In the graph, the first zero-crossing occurs where there is 360° of phase seen over the entire gap. The skew depicted in FIG. 5B, for example, lies just past the first zero-crossing (i.e. approximately 400° at an amplitude value of approximately −0.1) as depicted on the graph in FIG. 5C. It is noted that higher harmonics would have phases that are multiples of the phase of the fundamental frequency. These frequencies are extended out over a number of zero-crossings in the (sin x)/x function, and are therefore reduced to essentially negligible amplitudes.

It is noted that if a transition does not extend over the full width of the second shield 303, the phase will not exhibit as much distribution. For example, if the above case had the phase spread over 400°, then transitions of the same frequency that covered only half of the width of the second shield 303 would only have a 200° spread. This would produce a relative amplitude of 56% of the original amplitude. However, this half-width would also produce only half of the original peak interference, and would therefore produce 28% of the peak interference. Since higher harmonics will be evident (i.e, will occur) out past the first zero-crossing, the amplitudes are in general quite small. Thus, in the illustrative example, the peak amplitude of other harmonics will be reduced to less than 28% of the non-skewed case.

It is noted that the amount of relative skew, as well as the mechanism for achieving the skew, depends on the parameters of the disk drive system and the type of MR head employed. For example, depending upon the frequency of the servo pattern, a different relative skew angle will be used. A general conceptual overview of various methods which may be used to produce the desired relative skew between the head and a servo pattern in provided below in connection with FIGS. 6–8.

Figure 6:
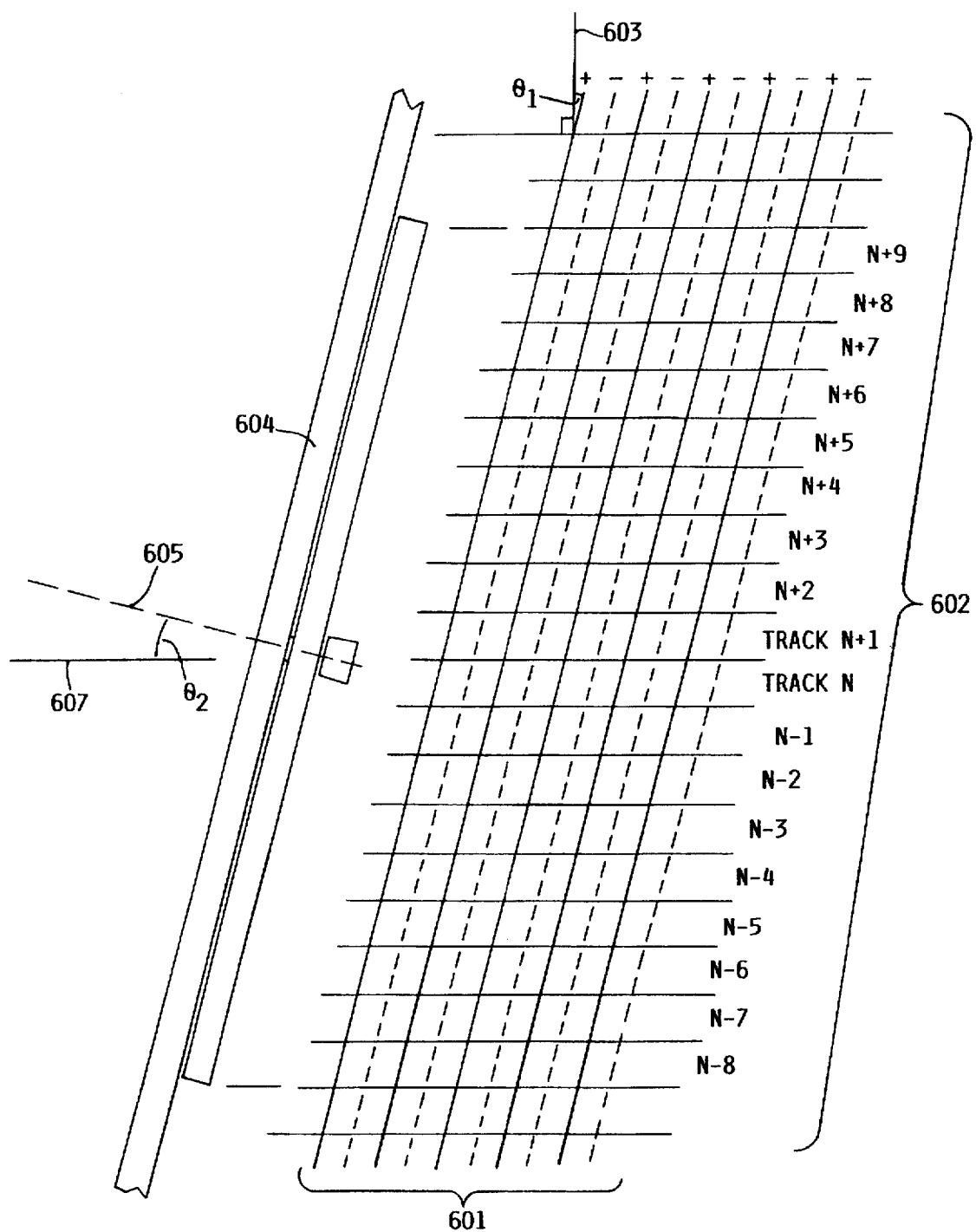
FIG. 6 illustrates conventional MR head/servo pattern alignment.

In FIG. 6, a servo pattern 601 is illustrated having a servo pattern of 5 MHz at the outer diameter of a 95 millimeter (mm) disk rotating at 7200 revolutions per minute (RPM). The servo pattern extends over a number of tracks and is comprised of standard phase aligned transitions of alternating polarity. As described above, the rotary actuator 102 moves along arc 106 (FIG. 1). Servo patterns are typically provided by writing servo information on the disk at a particular constant angular orientation of the disk. The head is moved out by a prescribed distance (e.g., a quarter of a track) and then another pattern is written to the disk as it is rotated to the particular angular orientation. This is continued until the head has moved across the entire group of tracks on which the servo pattern is being written.

Since the servo pattern is written at a constant angular position of the disk, the pattern extends along the portion of the arc 106 (FIG. 1) crossing the group of tracks on which the pattern is formed. The position along this arc will be referred to as a constant angular position arc. On the scale of a local region of the disk, as illustrated in FIG. 6, the servo pattern may be treated as successive straight lines defining an angle relative to a radial line 603 extending outward from the center of the disk. As described above, the number of tracks per inch (i.e., track density) is typically quite high. In the local area viewed in FIG. 6, the width of the track group N−8 to N+9 is on the order of 0.01 inch in many conventional disk drive storage devices. Thus, while a slight curvature in the pattern exists due to the arc of the actuator, the curvature is indistinguishable over such a small area and the pattern may be considered as a straight line extending over the group of tracks.

The angle defined with respect to the radial line will depend upon the portion of the arc 106 on which the servo pattern lies and is approximately equal to line tangent to the arc at the center of the locally viewed group of tracks. The angle may be either positive or negative as on the arc 106 (FIG. 1) or may be continuously increasing or decreasing angles depending upon the orientation of the actuator relative to the disk. It should be understood that references to angular orientation may refer to the locally viewed angle, or the aggregate angles over successively viewed local areas along the arc on the disk. Viewing the system as a local area is used to facilitate ease of understanding the principles described.

The servo pattern 601 is shown extending across a number of tracks 602 at an angle $\theta_1$ relative to the radial line 603. In the shown example, $\theta_1$ is equal to 14°. In other words, when a portion of the disk is viewed locally as illustrated in FIG. 6, the portion of the constant angular position arc extending across tracks 602 may be considered equivalent to a straight line at an angle of 14° with respect to the radial line 603. In a conventional system, as depicted in FIG. 6, the head is aligned with the lines of the servo pattern such that the head and actuator axis 605 are aligned relative to the track line 607 at an angle $\theta_2$. In the shown example, $\theta_2$ is equal to 14°. In this conventional case, the relative skew angle between the head 604 and the servo pattern 601 is 0°.

Figure 7:
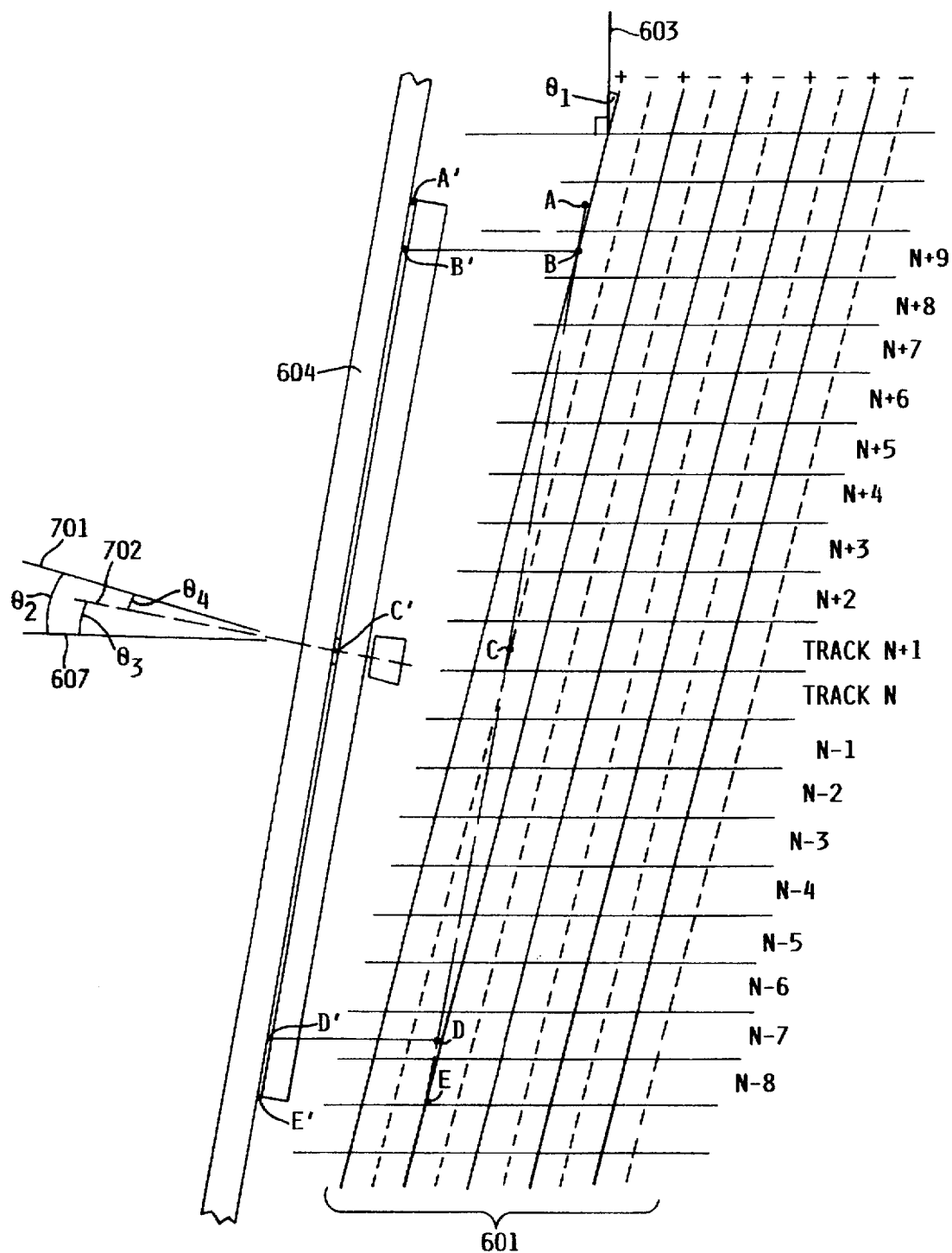
FIG. 7 illustrates head/servo pattern alignment in accordance with an embodiment of the invention.

Referring to FIG. 7, an embodiment of the invention in which a relative skew between the servo pattern 601 and the head 701 is introduced by directly skewing the head 604 relative to the actuator axis 701 will be described. In FIG. 7, the actuator axis 701 remains at an angle $\theta_2$ (e.g., 14°) with respect to the track line 607. The servo pattern 601 has a skew relative to the radial line 603 of $\theta_1$ (e.g., 14°). The head axis 702 has an angle $\theta_3$ relative to the track line 607. In the above example, angle $\theta_3$ is approximately 9.5°. Thus, the relative skew angle $\theta_4$ between the head and the pattern illustrated in FIG. 7 is approximately 4.5°.

In FIG. 7 the preferred manner in which the gap of the inductive read head 604 is aligned over the servo pattern 601 is illustrated. Points A–A', B–B' . . . E–E' illustrates the location of the gap over the servo pattern 601 as the disk is rotated to align the pattern under the disk.

For the frequencies used in the illustrated servo pattern 601, a relative skew between the servo pattern and the head of about 4.5° sufficiently reduces the undesirable interference by an amount equal to more than half of the original worst-case amplitude. For phase patterns extending all the way across the 100 μm width of the inductive read head 604, the 4.5° skew corresponds to a spread of about 200 nanoseconds. Since the original pulses are approximately 25 nanoseconds, this reduces the amplitude of the pulses to about one-eighth of the original amplitude.

If a smaller frequency bandwidth is used, the original pulse will be wider, thereby lessening the reduction. For patterns that are of a width less than approximately 100 μm, the spread will be even smaller. However, in this case, the original interference is also less than the worst-case, thereby making the need for interference reduction less significant. In each case, the interference should be less than half of the that of original worst-case condition, providing for significant improvement in detecting servo sector identification (SID) patterns and Gray codes, for example.

It is noted that other factors must be taken into consideration when directly skewing the head on the actuator. For example, skewing the head axis relative to the actuator axis may cause a change in the flying height or flying characteristics of the head. In the above example, a relative skew angle of 4.5° will cause an outer diameter flying height change of approximately 1.9 nanometers (nm) and approximately 1.1 nm at the inner diameter. However, such a change is generally within acceptable parameters for most systems.

In FIG. 7, the head is skewed by rotating the head axis 702 toward the track line 607 to an angle of approximately 9.5° with respect to the track line 607. In other words, the 4.5° is subtracted from the normal skew angle of the head. Alternatively, the 4.5° could be added to the normal skew head of the angle such that the head axis 702 would have an angle relative to the track line 607 of approximately 18.5°. While either case will effectively spread the phase transitions over the gap, the direction of skew will change the effective read and write element widths.

If the skew angle is added to the normal actuator skew direction, the read and write element widths are expected to be reduced by about 3%. If the skew angle is subtracted from the normal actuator skew direction, the widths will be increased by 3%. In the former case, the slightly lower element widths may be desirable if the disk is not banded all the way to the outer diameter. In this case, the change in widths does not have significant impact on the error rate at the very outer diameter and a 3% loss of signal will not be significant. It is noted that at the inner diameter, where the skew angle is typically smaller than the outer diamater, the signal loss can be less than 1%. Alternatively, if the angle is added rather than subtracted (i.e., the head is skewed in the other direction), the amplitudes will be higher. However, the tracks will have effectively reduced spacing due to the increased effective write element width. Accordingly, the angular difference between the servo pattern 601 and the head 604 will be selected depending upon the characteristics of the particularly disk drive implementing the described head skew technique.

It is noted that the linear density (i.e., spatial frequency) at the outer diameter (OD) of the disk is different from that at the inner diameter (ID) of the disk. At the OD, the data is more spatially spread out. Thus, a skew of the head by approximately 4.5° may cause the inductive read head to be spread over three consecutive transitions as, illustrated in FIG. 5B. However, since at the inner diameter the linear data is spaced closer together, a 4.5° skew of the head will cause the head gap to extend over a larger number of transitions. While this does not adversely affect the performance of the interference reduction (filtering), a more even distribution of the transitions as the head moves from the ID to the OD can be achieved by skewing the pattern (as opposed to the head) as described below. Moreover, it may not be necessary to skew the pattern at all at the ID since the interference phenomenon is not as pronounced at the ID.

Figure 8:
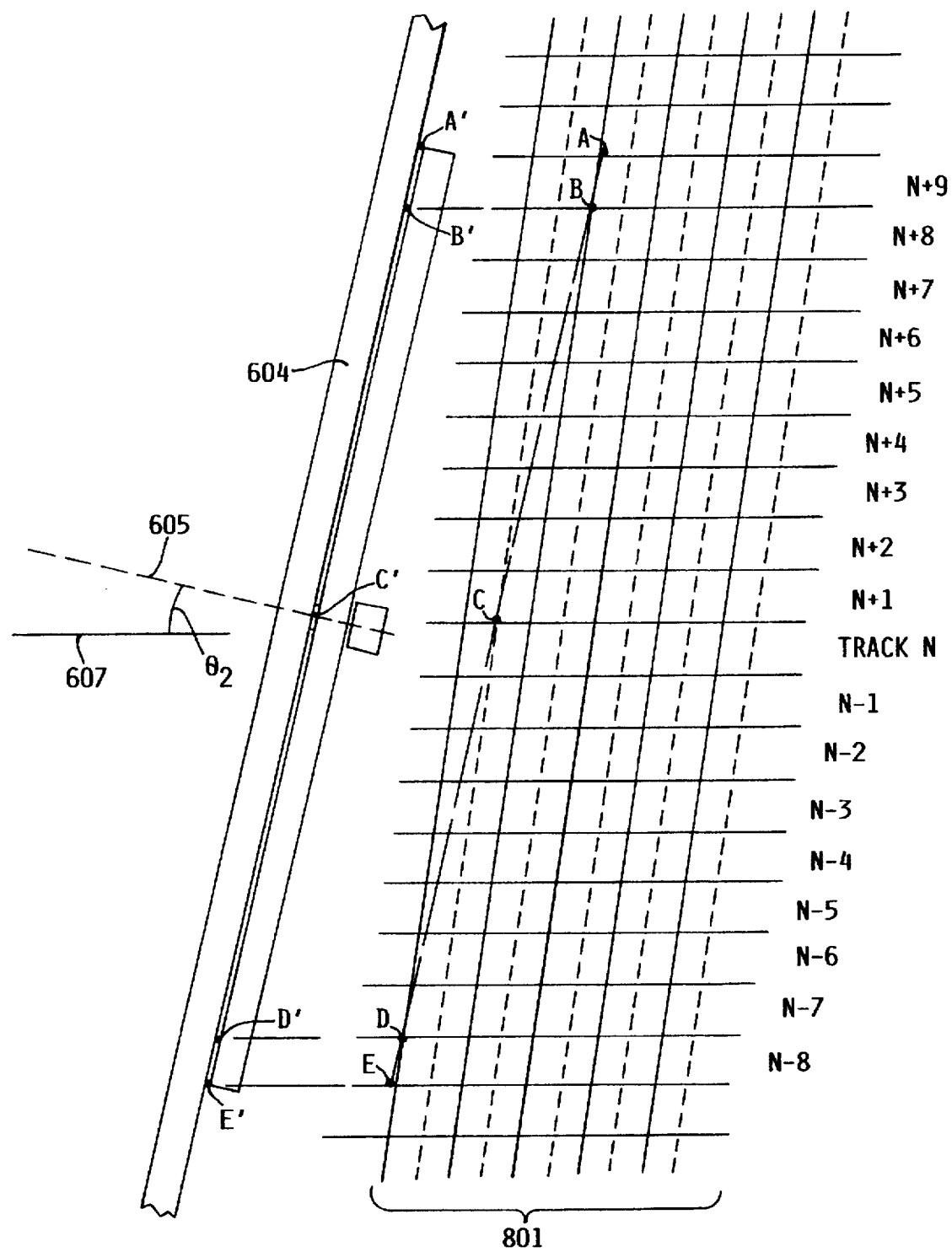
FIG. 8 illustrates head/servo pattern alignment in accordance with another embodiment of the invention.

An alternative embodiment in which the servo pattern 801 is skewed relative to the typical skew pattern 601 is illustrated in FIG. 8. As in FIG. 6, the actuator and head are aligned with respect to a common axis 605. The axis 605 has associated with it an angle $\theta_2$ of approximately 14° with respect to the track line 607. In this case it can be seen that the servo pattern 801 is skewed relative to the head. As can be appreciated, the relative skew of the servo pattern achieves substantially the same reduction in interference signal as skewing the head on the actuator. This approach eliminates the above-described adverse effects resulting from directly skewing the head on the actuator. In this case, a skew is introduced in the servo and data patterns by moving their relative positional locations on the track by a small distance around the disk, with the amount of movement increasing as a function of increasing radial displacement from the ID (or OD) of the disk.

In order to achieve a continuous spread of interference of about 200 nanoseconds, the outer diameter tracks may be written at a skew angle of about 4.5° with respect to the head. The amount of skew is less at smaller disk radii, down to about 2° at the inner disk radius. It is noted that the 2° skew at the inner disk diameter provides as great of reduction in interference with respect to the higher spatial frequencies as does the 4.5° skew provide at the outer disk diameter with respect to the lower spatial frequencies of the constant frequency servo system.

Similar to FIG. 7, FIG. 8 illustrates the manner in which points A–A', B–B' . . . E–E' of the gap of the inductive read head 604 will be spread across three consecutive phase aligned transitions. In FIG. 8, the spread is in the opposite direction than that illustrated in FIG. 7. However, it will be appreciated that a similar reduction in inductive interference will be achieved.

When the servo patterns are skewed in a manner as illustrated in FIG. 8, a change in the timing of the servo patterns must be taken into consideration. For example, in many disk apparatus, the spindle motor speed is controlled by comparing the read position of the SID patterns in the servo area relative to a master clock. During access operation from the inner diameter to the outer diameter, or vice versa, a significant change in SID timing would be measured as a result of the servo pattern skew. Thus, the spindle motor control speed controller must take into account the overall skew when performing servo control to ensure that the SID detection is possible over the full seek range.

Figure 9:
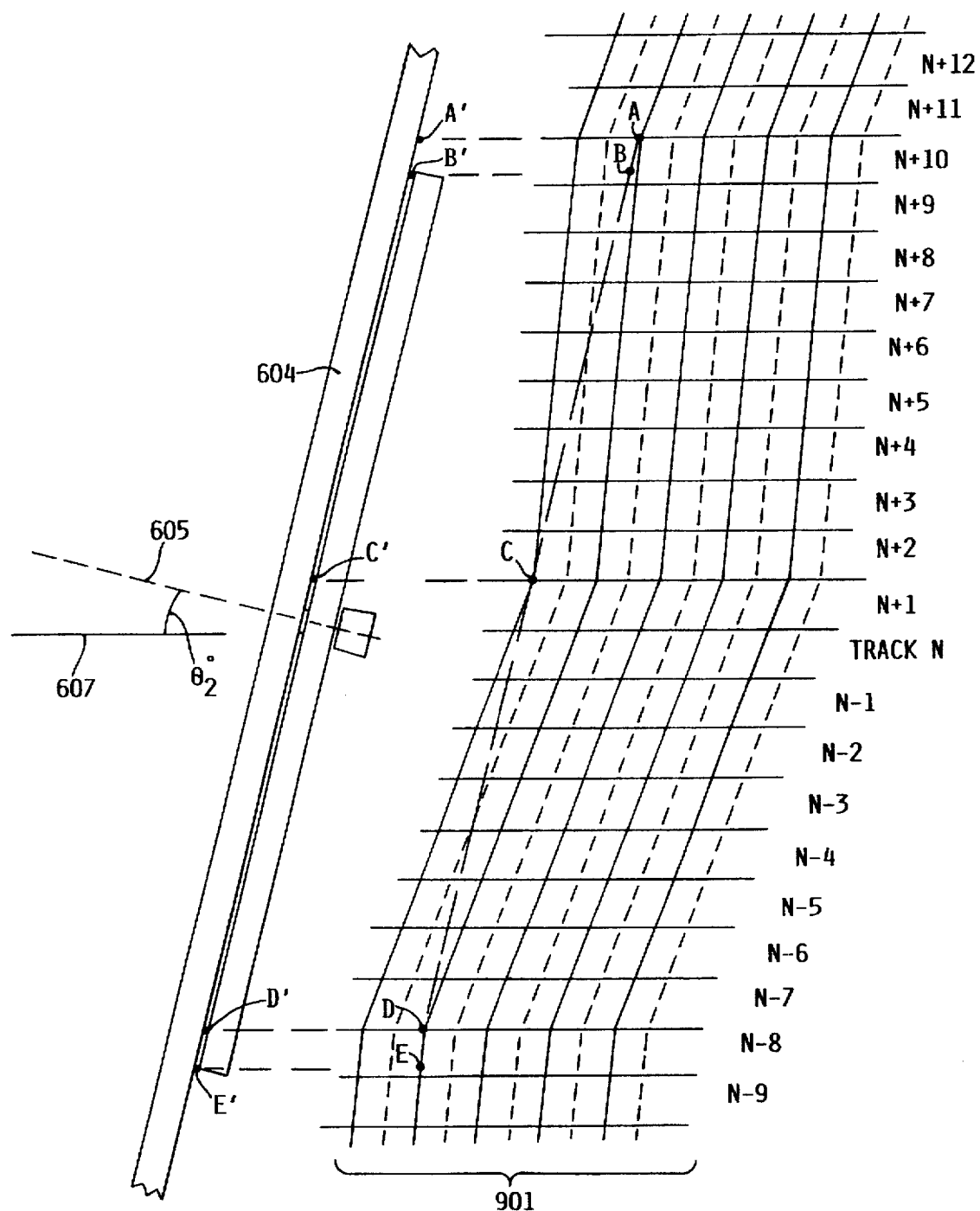
FIG. 9 illustrates head/servo pattern alignment in accordance with still another embodiment of the invention.

Another alternative skew technique is illustrated in FIG. 9. In FIG. 9, the skew pattern 901 is first skewed in one direction and then skewed in another direction. In the illustrated example, the pattern is skewed 200 nanoseconds in one direction within about half of the tracks associated with the inductive read head and then skewed back again in another direction within the other half of the tracks. In other words, one complete zig-zag pattern may extend over the width of the gap of the inductive read head 604. Again, such a skew effectively spreads the pattern sufficiently to reduce the overall interference signal.

Such a pattern also reduces the aforementioned changes in timing from the OD to the ID.

Figure 10:
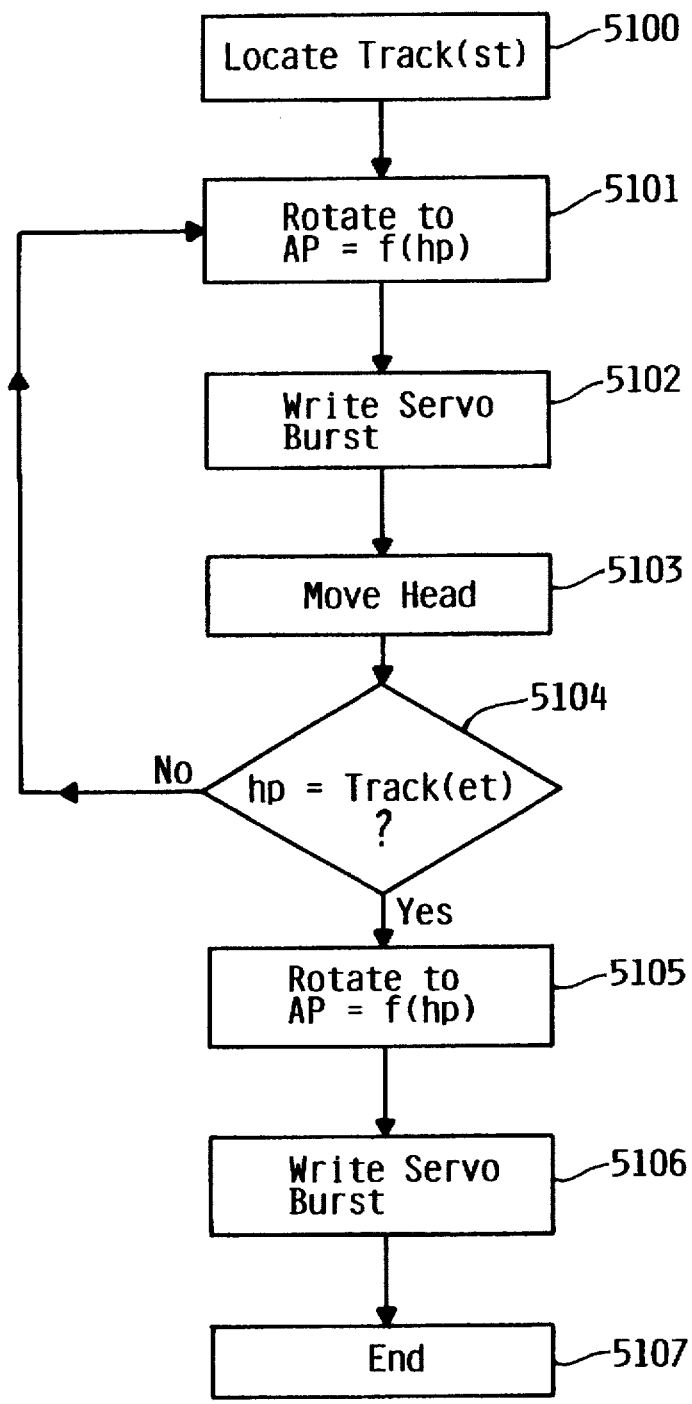
FIG. 10 is a flow chart illustrating a servo write operation in accordance with an embodiment of the invention.

A flow chart of a servo-write operation for writing a skewed servo pattern is depicted in FIG. 10. At step S100, the head is rotated by the rotary actuator 102 to locate and position the head above a starting track Track(st) of a group of consecutive tracks over which the servo pattern will be written. It is noted that the group of tracks may include all tracks on the disk or a subset of tracks on the disk. For example, gray code servo patterns are written on a subset of consecutive tracks.

The starting track Track(st) could be either the innermost or outermost track of the group of consecutive tracks depending upon which direction (i.e., radially inward or radially outward) the servo pattern will be written. For ease of illustration, it will be assumed that the starting track Track(st) is the innermost track of the group of consecutive tracks.

At step S101, an angular position AP of the disk 101 at which the servo burst for the servo pattern will be written is determined. In contrast to conventional servo writing operations which are carried out at a constant angular position of the disk, the angular position AP is determined as a function of the head position hp (i.e., AP=f(hp)). Various functions may be used to calculate the angular position AP. For example, the function may be associated with an initial angular position APO plus an offset. In this example, the angular position $AP_i=(AP_{i+1}+OSV)$, where i=0 at the initial track position (i.e., Track(st)) and OSV is a constant offset value. In this manner, as the head position moves from the innermost position to the outermost position, the offset from the initial angular position $AP_0$ gradually increases as the position of the head moves across the track.

To provide enhanced flexibility in the skewing introduced into the servo pattern, the angular position AP may set to a value dependant upon the radial position of the head. For example, the angular position may be set as $AP=(AP_c+OSV_r)$, where $AP_c$ is the constant angular position as conventionally used for writing servo bursts and $OSV_r$ is an offset value from the constant angular position. Each radius of the actuator has a corresponding offset value OSV which is used when the head is moved to a radius r from the innermost track of the disk. In this manner, the skew value could be varied from the ID to the OD of the disk as desired. The zig-zag pattern may be written for servo patterns extending across the disk in this manner as well. Alternatively, a zig-zag pattern may be written by incorporating a counter into to a loop of incremental offsets and by changing the sign of the offset each time the servo information is written to a certain number of tracks.

With the head at the desired radial position, and when the disk is rotated to the appropriate angular position AP determined at step S101, a servo burst is written to the disk at step S102. At step S103, the head is moved in a direction toward the ending track Track(et) by a prescribed distance. The prescribed distance will typically represent some fraction of the track pitch such as one quarter of a track, for example. At step S104, it is determined whether the current head position hp is equal to the ending track position Track(et). If so, the system proceeds to step S105, calculates the angular position AP for the ending track Track(et), and writes a servo burst at step S106. The servo writing operation then ends as step S107.

If the ending track Track(et) has not yet been reached at step S104, the operation returns to steps S101–S104 to consecutively write servo burst across the group of consecutive tracks at a skew angle determined by the angular position AP function of step S101 in the manner described above.

Figure 11:
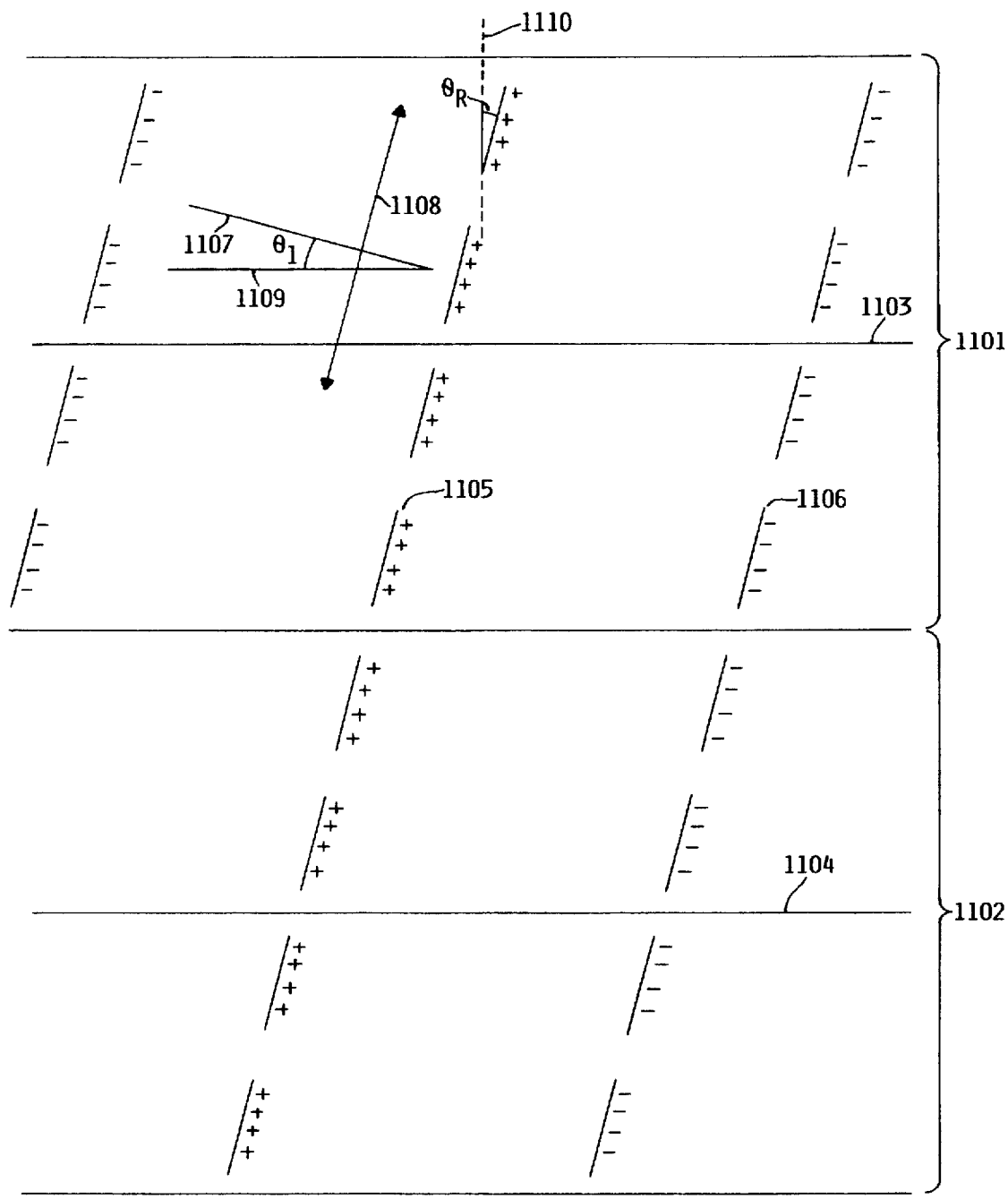
FIG. 11 illustrates servo pattern orientation at a constant angular position.
Figure 12:
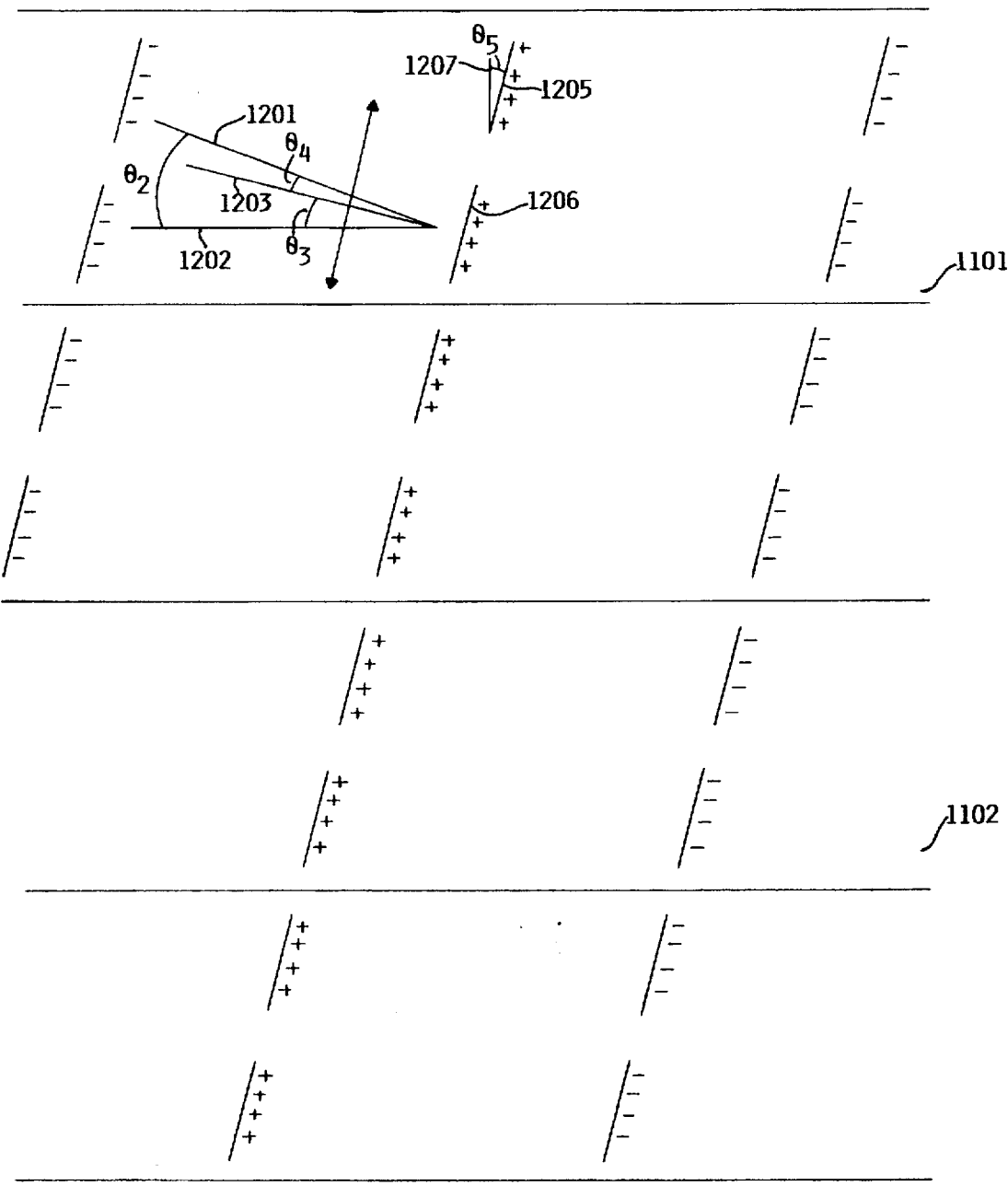
FIG. 12 illustrates servo pattern orientation in accordance with an embodiment of the invention.
Figure 13:
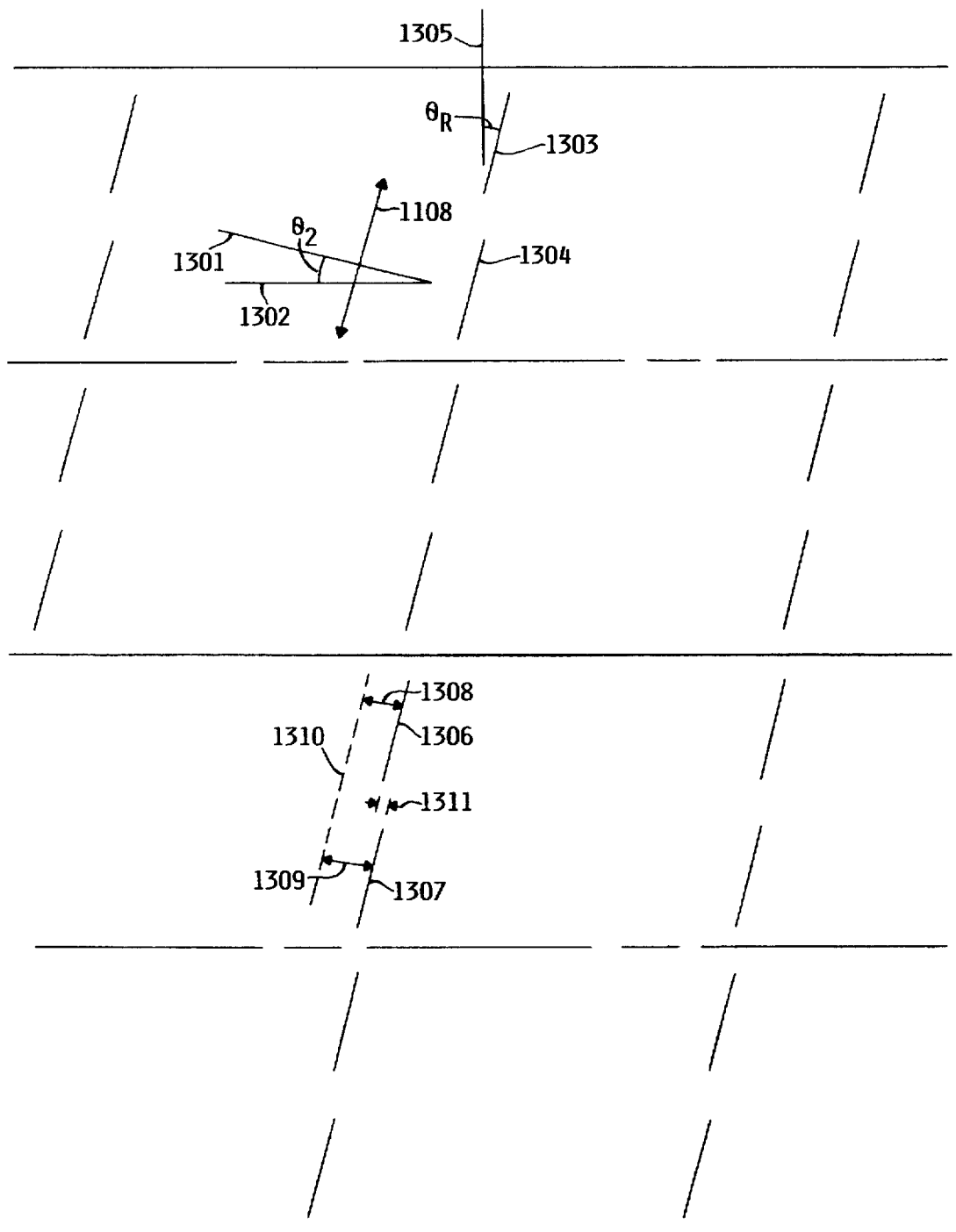
FIG. 13 illustrates servo pattern orientation in accordance with another embodiment of the invention.

Close up views of servo patterns are illustrated in FIGS. 11–13. In FIG. 11, a servo pattern is written across two tracks 1101 and 1102 having respective track centers 1103 and 1104. The patterns represent phase aligned positive and negative polarity transitions 1105 and 1106, respectively. The illustrated servo bursts are written at one quarter track width positions. The patterns in FIG. 11 exhibit a conventional constant angular alignment. The head is aligned along axis 1107 which is skewed at an angle $\theta_1$, equal to 14° in the shown example, with respect to the track line 1109. As in FIG. 6, the axis 1107 corresponds to both the actuator axis and the head axis. The shield gap extends across a number of tracks in the direction indicated by line 1108. The patterns have an angle $\theta_r$ relative to the radial line 1110. In the illustrated example, $\theta_r$ is equal to 14°.

In FIG. 12, the same two tracks are illustrated. The servo pattern in FIG. 12, however, illustrates a pattern written using a head which has been skewed relative to the actuator axis. As in FIG. 11, the actuator axis 1201 is skewed relative to the track line 1202 by an angle $\theta_2$. In the shown example $\theta_2$ is equal to 14°. The head is skewed at an angle $\theta_3$ with respect to the track line 1202 to from a relative skew angle $\theta_4$. In the shown example, $\theta_3$ equals 9.5° and $\theta_4$ equals 4.5°.

As a result of the head skew in FIG. 12, the servo patterns 1205 and 1206 are written to the disk having an angle $\theta_5$ relative to the radial line 1207. In the shown example, $\theta_5$ is equal to 9.5°. However, the average angle between the servo patterns remains 140°. In other words, while the local angular orientation of a recorded section of the servo pattern changes as a result of the head skew, the average angle of servo pattern written across a number of consecutive tracks is the same as the conventional servo pattern illustrated in FIG. 11. Accordingly, a relative skew between the head and the servo pattern results. In the illustrated example, the relative skew is 4.5°.

In FIG. 13, a close-up view of a servo pattern skewed relative to the head orientation is illustrated. In FIG. 13, the head and actuator have a common axis 1301 skewed from the track line 1302 by an angle θhd 2. In the illustrated example, $\theta_2$ equals 14°. The individual servo patterns 1303 and 1304 are skewed at an angle $\theta_r$ (14° in the shown example) relative to the radial line 1305.

The pattern is skewed relative to a constant angular position pattern by introducing an offset into the timing for writing the individual sections of the recorded pattern. In other words, the patterns are written to the disk offset by a prescribed distance in the direction of the track from a point where the pattern would have been written to the disk at a constant angular. For example, if pattern 1303 were considered a reference position for the constant angular position of the disk, then burst patterns 1306 and 1307 are written to the disk offset from the constant angular position (illustrated by line 1310) by prescribed distances 1308 and 1309, respectively. The two patterns have a relative offset 1311 along the direction of the track.

In the example illustrated in FIG. 13, the average angle between two recorded sections of the servo pattern is 9.5°. Thus, the overall servo pattern of FIG. 13 extends across the tracks at an effective skew angle relative to the head.

Figure 14:
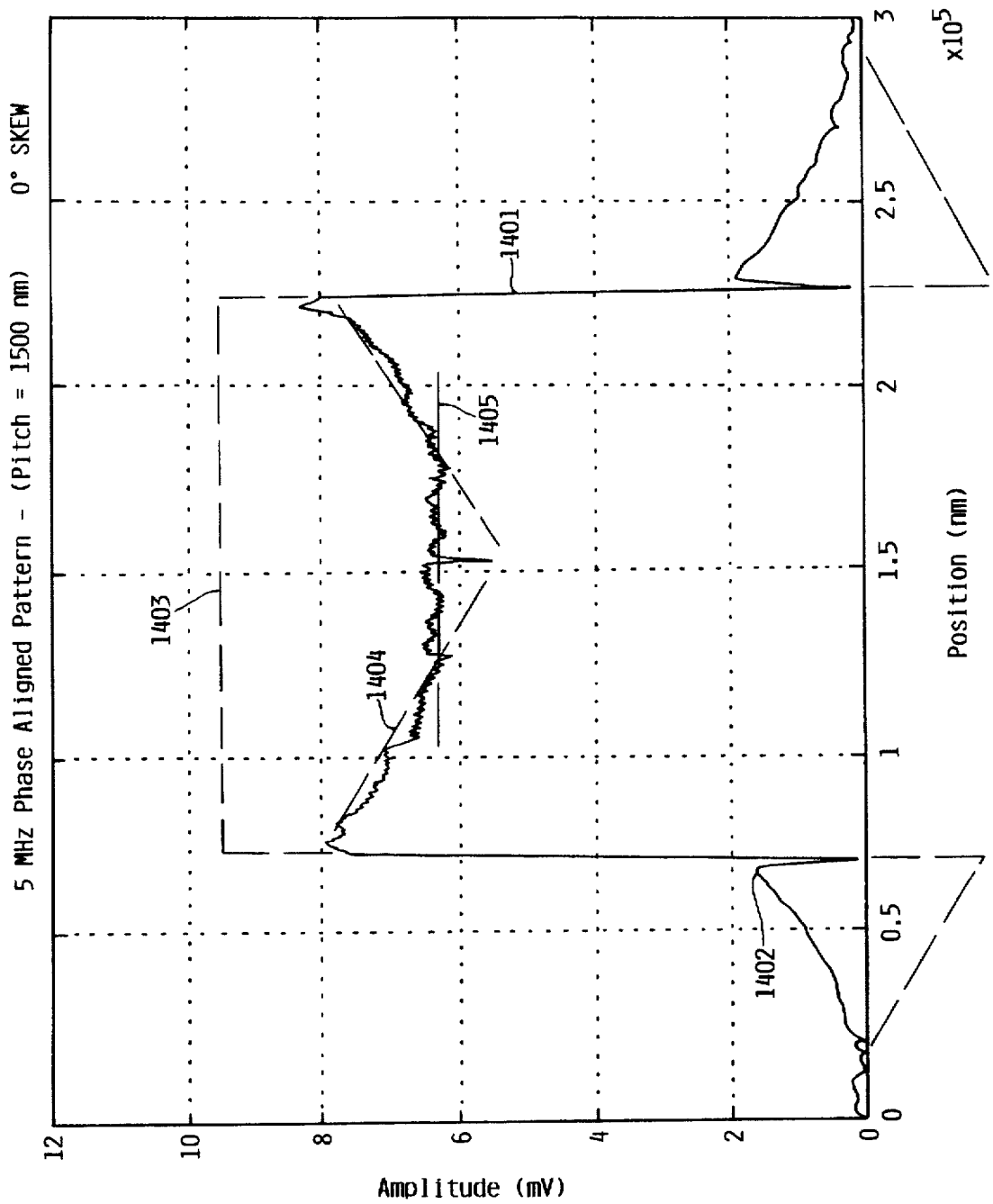
FIG. 14 is a graph illustrating an interference phenomenon associated with a conventional head/servo pattern alignment.
Figure 15:
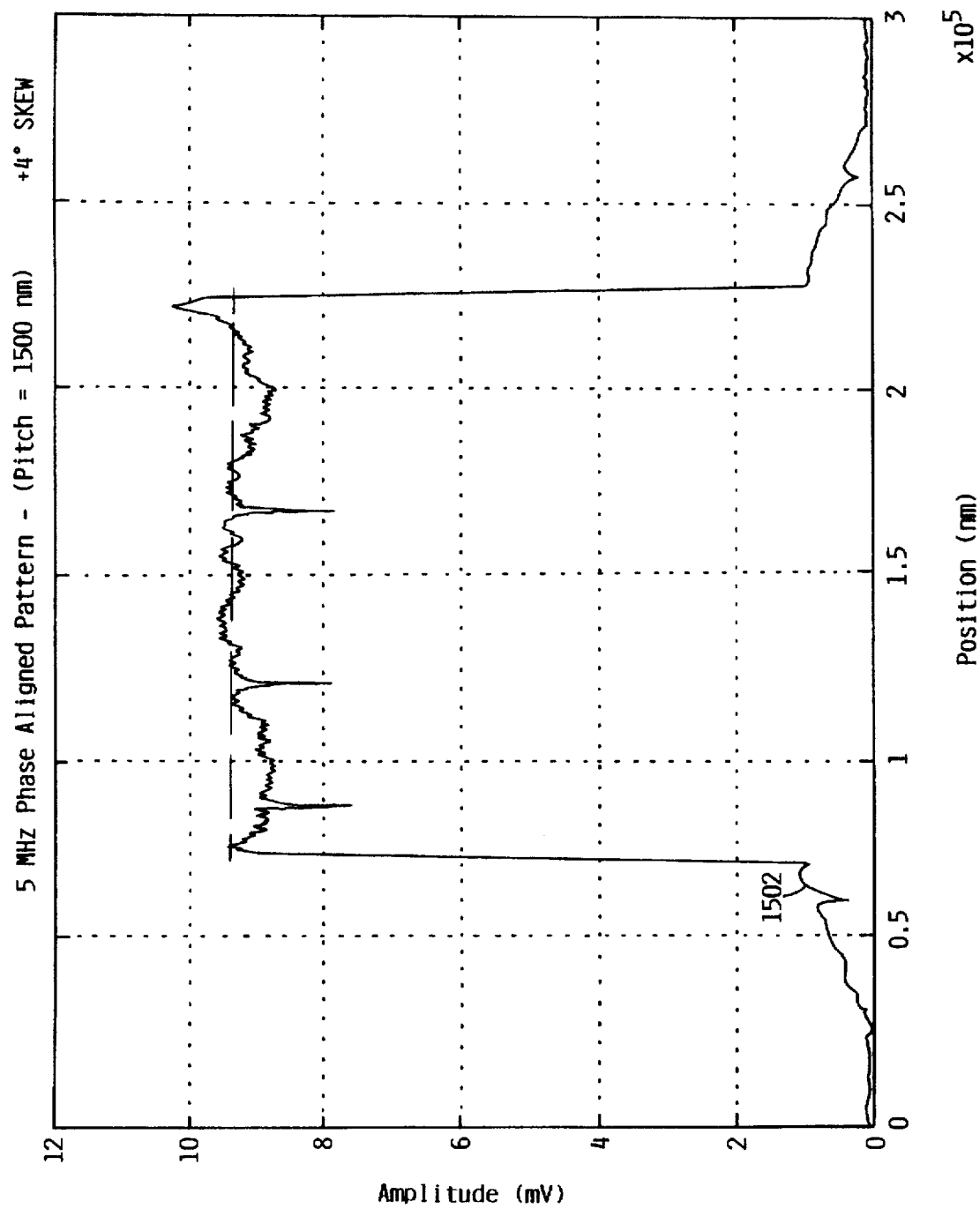
FIG. 15 is a graph illustrating a reduction in interference achieved in accordance with an embodiment of the invention.
Figure 16:
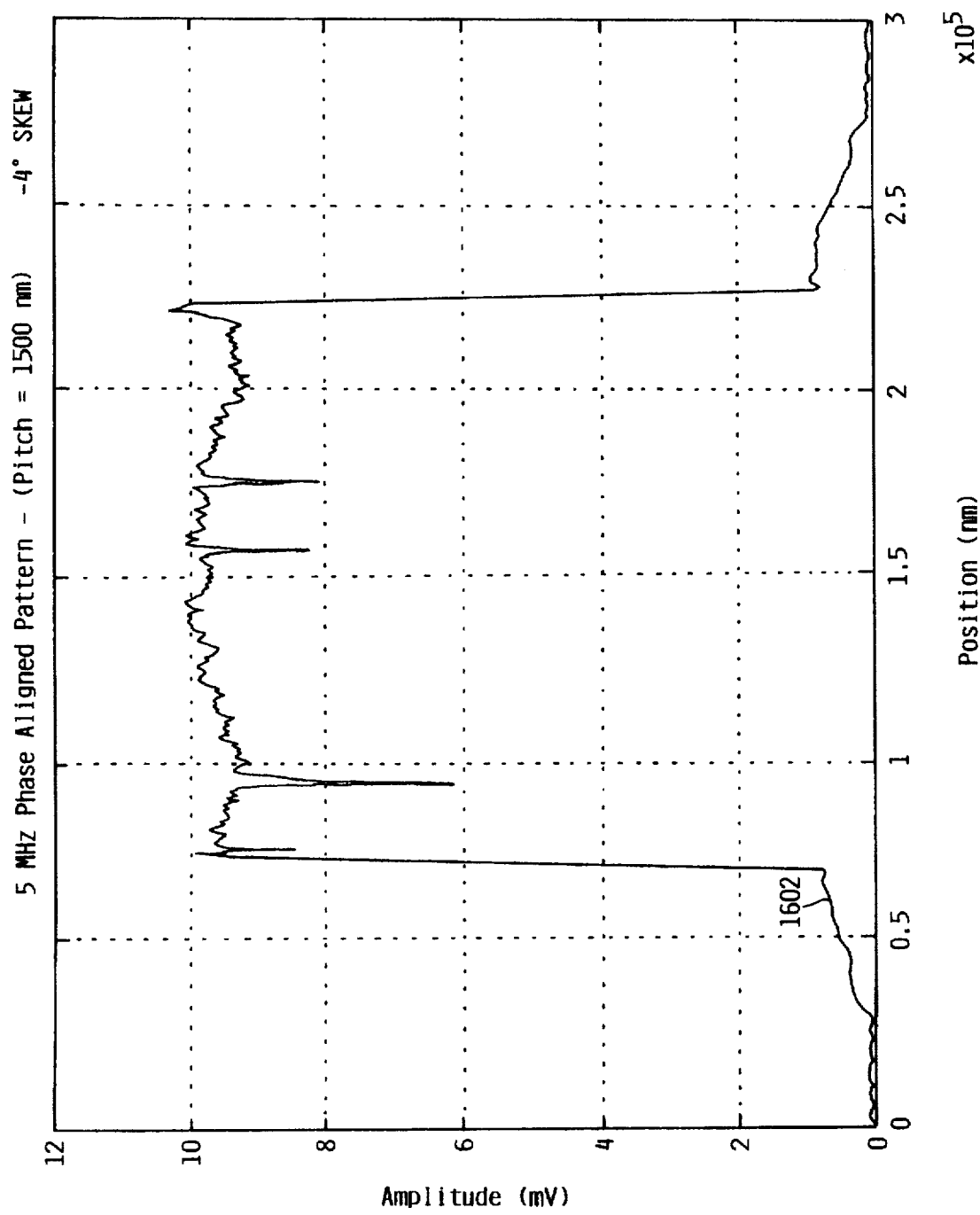
FIG. 16 is a graph illustrating a reduction in interference in accordance with another embodiment of the invention.

The reduction in undesirable interference associated with the inductive read head of the shields 301 and 303 is illustrated in the graphs of FIGS. 14–16. These graphs illustrate read signals obtained from a precision test stand, and represent the measured signal amplitudes when moving across 5 MHz phased patterns for zero skew, for +4° skew and for –4° skew, respectively. The figures illustrate a relationship between the fundamental (5 MHz) signal versus radial position when scanning across approximately 50 consecutive tracks on which a recorded phase aligned pattern is written to the center 25 tracks.

In FIG. 14 the interference phenomenon associated with a non-skewed conventional system (i.e., a system having a zero degree relative skew between the head and pattern) is illustrated. In FIG. 14, the fundamental (5 MHz) signal 1401 builds up to about 1.6 mV at a point 1402 where a side of the shield begins to pass over the recorded pattern, which is about 0.5 mm (50 µm) before the MR read element passes over to the recorded pattern. This interference signal is inverted relative to the normal read signal (i.e., actually represents a negative 1.6 mV). Thus, the waveform drops to zero just before the main positive MR signal amplitude is read.

As the MR head reads the first recorded signal, the signal amplitude rises to approximately 7.9 mV. This value includes a negative component of 1.6 mV as a result of the interference signal. Without the interference component the signal would be approximately 9.5 mV as illustrated by the dashed line 1403.

As the head is moved to the right, a larger portion of the shield (inductive read head) moves over the recording area for approximately another 0.5 mm. As more of the shield moves over the recorded signal on adjacent tracks, the interference component of the signal is increased. As the graph illustrates, the interference amplitude is approximately 1.6 mV when approximately half of the shield covers the phase aligned signal. The amplitude of the interference component increases in a generally linear fashion following line 1404 to a value of 3.2 mV when the entire shield is oriented over the record area of the disk. The signal then remains substantially constant until the shield begins to move past the recorded area. As a result of the interference, the amplitude of the fundamental signal in the center of the band is reduced to about 6.2 mV. The MR signal absent the interference component would be approximately 9.5 mV. Thus, the interference causes a significant reduction in the amplitude of the read signal.

The right side of the graph (as viewed on the sheet) is nearly a reflection of the left side. The amplitude of the interference signal decreases as less of the head covers the phase aligned recorded signal.

The graphs of FIGS. 16 and 17 illustrate the test signal pickup when respectively introducing a positive and a negative 4° relative skew between the head and the recorded servo pattern. The two graphs are similar except a slight difference in amplitudes.

At the first track read by the MR head, the interference is smaller than the conventional zero skew case, and is about 90° out of phase with respect to the signal read by the MR head. Thus, the interference does not significantly change the amplitude of the fundamental signal, but does phase shift the amplitude slightly. As the shield moves radially outward to cover more of the recorded pattern (i.e., as more of the shield covers the recorded pattern), the phase of the signal read by the inductive read head becomes nearly 180° out of phase with the MR signal and thus operates to decreases the MR signal amplitude. However, as the head moves to encompass more of the written tracks (e.g., when 360° of transitions are spread over the width of the inductive read head) the amplitude of the interference drops to zero and the overall signal amplitude is the expected MR amplitude. As the inductive read head completely encompasses the recorded pattern, the skew sensitivity goes through a null and inverts to a small amplitude, which adds to the signal amplitude in the center of the figure. It is noted that the small glitches in the plot are associated with the tester and do not represent actual reductions in signal amplitude.

In the case of a +4° skew as illustrated in FIG. 15, the smallest fundamental amplitude is about 8.8 mV in contrast to the minimum of 6.2 mV for the zero skew case (FIG. 14). This represents a 42% increase in amplitude of the read signal. For fully optimized MR bias current, this increase would be approximately 30%. Similar advantages are achievable using a configuration having a negative skew as illustrated in FIG. 16.

As illustrated above, a relative skew between the head and the servo pattern significantly reduces the interference phenomenon associated with the use of an MR head. The various embodiments described above are provided by way of illustration and are not intended to limit the invention. Other mechanisms for reducing the amount of interference associated with the inductive read head of the MR head shielding will be readily apparent upon review of the above disclosure. The invention is also not limited to interference associated with servo patterns. Rather, any patterns which are phase aligned across a group of consecutive tracks will cause significant interference which can be eliminated by the techniques described above. Thus, the scope of the invention is only limited by the appended claims.

What is claimed is:

1. A memory device for storing data comprising:
   a housing;
   a disk rotatably mounted in said housing, said disk having a servo pattern formed on a surface of the disk, the servo pattern extending over a first plurality of tracks, formed on said disk, for storing information, from an inner track of said first plurality of tracks to an outer track of said first plurality of tracks at a first orientation relative a radial line extending from a center of the disk; and
   a transducer, including a shielded magneto-resistive element, movably mounted within said housing to read the information from the first plurality of tracks, the transducer being mounted at a second orientation relative to this radial line to form a relative skew between the servo pattern and the transducer such that an interference component of a signal read using the transducer is reduced.

2. A memory device as recited in claim 1, wherein the servo pattern extends continuously from an inner diameter of said disk to an outer diameter of said disk.

3. A memory device as recited in claim 2, wherein the first orientation of the servo patterns and the second orientation of the transducer form a relative skew between the servo pattern and the transducer of about 4.5 degrees.

4. A memory device as recited in claim 1, wherein:

the servo pattern further extends over a second plurality of tracks, an inner track of said second plurality of tracks being adjacent to an outer track of said first plurality of tracks;

a shield width of said transducer extends over at least a portion of both said first plurality of tracks and said second plurality of tracks; and the servo pattern extends over the second plurality of tracks at a third orientation relative to the radial line to form a zig-zag pattern over the first and second plurality of tracks.

5. A memory device as recited in claim 1, wherein the first orientation of the servo pattern is such that the servo pattern is formed on the disk at a position of the transducer above each of the-first plurality of tracks at a constant angular position of the disk and the transducer is skewed relative to the servo pattern.

6. A memory device as recited in claim 1, wherein the servo pattern is offset from a position of the transducer above each of the first plurality of tracks at a constant angular position of the disk to form a servo pattern such that the servo pattern is skewed relative to the transducer.

7. A memory device as recited in claim 1, wherein the transducer further comprises a first and second shield having a gap therebetween, the magneto-resistive element being disposed within the gap, and wherein magnetic flux leaks through the gap between the first and second shields producing the interference component of a signal read by the transducer.

8. A memory device as recited in claim 1, wherein the transducer further includes a write head for writing information to the first plurality of tracks.

9. A memory device as recited in claim 1, wherein the servo pattern comprises a plurality of phase aligned servo transitions.

10. A memory device as recited in claim 8, wherein the servo pattern is comprised of a servo sector identification mark.

11. A memory device as recited in claim 8, wherein the servo pattern comprises a gray code pattern.

12. A memory disk for use in a disk storage device including a magneto-resistive transducer for reading information from the memory disk, the memory disk comprising:

a plurality of concentric tracks provided around the memory disk, each track including a plurality of servo sectors; and a servo pattern associated with each servo sector, the servo pattern including a plurality of burst patterns extending in a generally radial direction across the plurality of tracks, wherein each burst is offset, from a position on the disk over which the transducer is positioned at a constant angular position of the disk, by a corresponding distance.

13. A memory disk as recited in claim 11, wherein the servo pattern is skewed relative to an angular orientation of the transducer to eliminate an interference component of a signal read from the memory disk by the transducer.

14. A memory disk as recited in claim 11, wherein the corresponding distance of the offset for each burst increases as a function of increasing radius from a center of the memory disk.

15. A memory disk as recited in claim 11, wherein the tracks are arranged into track groups, and the corresponding distances of the offset for each burst provides a zig-zag pattern within each group.

16. A method of forming a servo pattern over a plurality of consecutive tracks on a memory disk for use in a disk storage device where the servo pattern is read using a shielded magneto-resistive element, the method comprising the steps of:

(a) positioning a transducer at a first position corresponding to a beginning track of said plurality of consecutive tracks;

(b) rotating said disk to a first angular position;

(c) writing a servo burst pattern to the disk at the first angular position of the disk;

(d) moving the transducer a predetermined distance toward an ending track of said plurality of consecutive tracks;

(e) rotating said disk to an angular position offset from the first angular position by a value corresponding to a position of the transducer;

(f) writing a servo burst pattern to the disk at the angular position of the disk in step (e); and (g) repeating steps (d) through (f) until a position of the transducer corresponds to the ending track of said plurality of consecutive tracks so as to form a relative skew between an orientation of the servo pattern and an orientation of the shielded magneto-resistive element.

17. A method as recited in claim 16, wherein the value corresponding to the position of the transducer increases as the transducer moves from the beginning track of said plurality of consecutive tracks to the ending track of said plurality of consecutive tracks.

18. A method as recited in claim 15, further comprising the step of selecting the value corresponding to the position of the transducer to form a zig-zag pattern extending from the beginning track of said plurality of consecutive tracks to the ending track of said plurality of consecutive tracks.

19. A method as recited in claim 15, wherein the predetermined distance corresponds to a fraction of a width of a track of said plurality of consecutive tracks.

20. A method as recited in claim 18, wherein the fraction corresponds to ¼ of the width of a track.

21. A disk storage device, comprising:

a housing;

a disk mounted in said housing having a plurality of concentric tracks, said disk having a servo pattern extending across said tracks;

a rotary actuator; and a magneto-resistive (MR), head mounted to said rotary actuator and having a shield extending across a number of said tracks along a shield axis in a direction substantially perpendicular to a head axis of the MR head, said rotary actuator rotating along a prescribed arc so as to selectively position said MR head above a desired track, wherein the shield axis is skewed relative to a direction in which said servo pattern extends across said tracks.

22. A disk storage device as recited in claim 20, wherein the servo patterns are formed at a constant angular position of the disk and along the prescribed arc, the MR head being rotated relative to an actuator axis by a predetermined skew angle.

23. A disk storage device as recited in claim 20, wherein the servo patterns comprise a number of servo bursts each formed on said disk offset from the prescribed arc at a constant angular position of the disk by a corresponding offset value.

24. A disk storage device as recited in claim 22, wherein the corresponding offset value for each servo burst is a function of a position of the MR head along the prescribed arc.

25. A memory device for storing data comprising:

a magnetic medium having a plurality of tracks for storing data, the magnetic medium further having a servo pattern provided on the magnetic medium and extending over at least part of said plurality of tracks; and a transducer, including a magneto-resistive element having a shield associated therewith, mounted to provide relative movement between the magnetic medium and the transducer to read data stored on the magnetic medium, wherein a relative skew between the servo pattern and the transducer is provided to reduce an interference component of a signal read using the transducer picked up by the shield of the transducer.

* * * * *

UNITED STATES PATENT AND TRADEMARK OFFICE
CERTIFICATE OF CORRECTION

PATENT NO. : 5,790,341

DATED : AUGUST 4, 1998

INVENTOR(S) : CUNNINGHAM ET AL.

It is certified that error appears in the above-identified patent and that said Letters Patent is hereby corrected as shown below:

column 13, in line 1 of claims 13-15, please replace "11" with ---12---.

column 14, in line 1 of claims 18-19, please replace "15" with ---16---.

column 14, in line 1 of claim 20, please replace "18" with ---19---.

column 14, in line 1 of claims 22-23, please replace "20" with ---21---.

column 15, in line 1 of claim 24, please replace "22" with ---23---.

Signed and Sealed this

Nineteenth Day of January, 1999

Attest:

*Acting Commissioner of Patents and Trademarks*

*Attesting Officer*